US012542377B2

(12) United States Patent
Legay et al.

(10) Patent No.: US 12,542,377 B2
(45) Date of Patent: Feb. 3, 2026

(54) SATELLITE PLATFORM AND METHOD FOR RECONFIGURING THE ELECTROMAGNETIC BEAM OF SUCH A SATELLITE PLATFORM

(71) Applicant: THALES, Meudon (FR)

(72) Inventors: Hervé Legay, Plaisance du Touche (FR); Ségolène Tubau, Toulouse (FR)

(73) Assignee: THALES, Meudon (FR)

(*) Notice: Subject to any disclaimer, the term of this patent is extended or adjusted under 35 U.S.C. 154(b) by 101 days.

(21) Appl. No.: 18/706,872

(22) PCT Filed: Oct. 25, 2022

(86) PCT No.: PCT/EP2022/079794
§ 371 (c)(1),
(2) Date: May 2, 2024

(87) PCT Pub. No.: WO2023/078736
PCT Pub. Date: May 11, 2023

(65) Prior Publication Data

US 2025/0038428 A1 Jan. 30, 2025

(30) Foreign Application Priority Data

Nov. 4, 2021 (FR) ...................................... 2111690

(51) Int. Cl.
*H01Q 21/26* (2006.01)
*H01Q 1/28* (2006.01)
*H01Q 3/34* (2006.01)
*H01Q 21/24* (2006.01)

(52) U.S. Cl.
CPC ............ *H01Q 21/26* (2013.01); *H01Q 1/288* (2013.01); *H01Q 3/34* (2013.01); *H01Q 21/245* (2013.01)

(58) Field of Classification Search
CPC .......... H01Q 1/08; H01Q 1/085; H01Q 1/288; H01Q 1/44; H01Q 3/26; H01Q 3/34; H01Q 9/16; H01Q 21/245; H01Q 21/26
See application file for complete search history.

(56) References Cited

U.S. PATENT DOCUMENTS

| | | | | |
|---|---|---|---|---|
| 10,347,974 | B1 | 7/2019 | Palmer et al. | |
| 11,152,987 | B1 | 10/2021 | Deshpande | |
| 2022/0239009 | A1 * | 7/2022 | Zhou ................... | H01Q 19/192 |

* cited by examiner

*Primary Examiner* — Daniel Munoz
(74) *Attorney, Agent, or Firm* — BakerHostetler

(57) ABSTRACT

A satellite platform includes an array of N antennas (Ai, i=1 to 6) and a beamformer, each antenna comprising the satellite casing and a respective metal strand (i=1 to 6) extending in the plane of the Earth face of the satellite, such that if N>2, the axis of the nth strand on the Earth face of the satellite is obtained by rotation of $+2\pi/N$, n=2 to N, of the axis of the (n-1)th strand; the beamformer calculates, as a function of a target directivity and polarization to be implemented by the antenna array, an attenuation and a phase-shift selectively for each antenna and applies, to the electrical signal intended for each antenna, the attenuation and phase-shift calculated for the antenna and delivers the duly adapted signal to the antenna to the associated connector.

10 Claims, 8 Drawing Sheets

SATELLITE PLATFORM AND METHOD FOR RECONFIGURING THE ELECTROMAGNETIC BEAM OF SUCH A SATELLITE PLATFORM

CROSS-REFERENCE TO RELATED APPLICATIONS

This application is a National Stage of International patent application PCT/EP2022/079794, filed on Oct. 25, 2022, which claims priority to foreign French patent application No. FR 2111690, filed on Nov. 4, 2021, the disclosures of which are incorporated by reference in their entireties.

FIELD OF THE INVENTION

The invention relates to the field of the antennas disposed on satellites, for HF, VHF, UHF radiocommunications: the antennas usually used are dipole or monopole antennas, each dimension of the size of the satellite being smaller than the wavelength.

BACKGROUND

A dipole antenna consists of the association of two metal strands. It is supplied with power at its middle and intended to transmit or receive electromagnetic energy. The strands are normally aligned along the same axis, which defines the linear polarization of the wave emitted or received. A dipole antenna is normally used when the length of each of its two strands corresponds to a quarter wavelength. The resonance of the mode that is established therein makes it possible to simply adapt the antenna to the traditional transmission lines. The radiation associated with such a dipole antenna is well known to the person skilled in the art: referring to FIG. 1, by using the normal breakdown (see below) of the radiated electrical field $\vec{E}$ at the point M according to the components $E_\theta$ and $E_\varphi$, such that $\vec{E}=E_\theta \cdot \vec{e}_\theta + E_\varphi \cdot \vec{e}_\varphi$, the field radiated by such a dipole oriented along the axis OZ radiates exclusively according to the component $E_\theta$. The intensity of the field produced is maximal in the plane orthogonal to the dipole.

The normal breakdown mentioned above uses the base of the spherical coordinates: when only θ varies, M describes a semi-circle and the unitary vector $\vec{e}_\theta$ is tangential to this semi-circle; when only φ varies, M describes a semi-circle and the unitary vector $\vec{e}_\varphi$ is tangential to this semi-circle. Details will be found at https://en.wikipedia.org/wiki/Spherical coordinate system.

It is also known practice to associate two orthogonal dipoles, which gives operation in the two orthogonal linear polarizations. The antenna then comprises four strands, distributed every 90°. The two pairs of strands (or dipoles) are excited at their center with two electromagnetic signals, making it possible to radiate two independent signals in the two orthogonal linear polarizations. The directions of maximum radiation corresponding to each dipole will however be situated in orthogonal planes. The plane in which the field radiated by one dipole is maximal corresponds to a field of zero intensity for the dipole disposed orthogonally with respect to the first.

Such dipole antennas have already been formed on nanosatellites. However, in the VHF or UHF band in particular, a nanosatellite or a minisatellite has dimensions comparable to a fraction of a wavelength: it interferes significantly with a dipole antenna, which significantly affects its own radiation. Also, the first approaches followed in the scientific community favored a symmetrical positioning of the dipole with respect to the nanosatellite in order to avoid the excitation of spurious resonances on the body of the satellite, and reduce its diffraction or even a positioning away from the body of the satellite. Arrangement constraints do however result therefrom, which are added to all the other specifications (diversity of direction of radiation, diversity of polarization).

A monopole antenna is a simplification of the dipole antenna. It is composed of a single metal strand, and normally disposed at the center of a ground plane, of large dimension with respect to the wavelength. The symmetrical position makes it possible to minimize the diffractions generated by this ground plane when its size is of the same order of magnitude as the wavelength. By observing these arrangement conditions, such an antenna radiates primarily in the upper half-plane of the ground plane. When applied to a rectangular minisatellite (like the 12 U or 16 U nanosatellites, with 1 U=10*10*10 $cm^3$), this approach imposes specific arrangement points, at the center of the large side of the nanosatellite, as presented. It then becomes difficult to form several antennas.

Furthermore, in the case of dipole or monopole antennas, the deployment of a solar panel connected to the satellite affects the condition of symmetry, and can then further increase the diffraction of the satellite.

The existing solutions therefore prioritize the antenna subsystems which are formed on the satellite so as to minimize the diffraction of the satellite. It is then very difficult to form several antennas in such conditions.

These wire antennas presented above are conventionally used as passive antennas, therefore producing a radiation that is fixed, and not reconfigurable.

Moreover, a beamforming is applied as is known to identical radiating elements, the individual radiation of which covers all of the specified angular segment. The beamforming then makes it possible to increase the gain of the antenna, and to produce a more directional beam, which can be oriented in a more specific direction within this angular segment, using a beamformer which distributes to the different elements the same signal affected by a phase weighting. This approach has not been able to be applied in the dipole or monopole type application cases of the prior art described above, because, by virtue of the constraints of installation of the antennas to reduce the diffraction, it is not possible to produce several radiating elements exhibiting the same radiation pattern.

SUMMARY OF THE INVENTION

To this end, according to a first embodiment, the present invention describes a satellite platform comprising:

- a satellite delimited by a satellite casing composed of metal walls of the satellite, said walls comprising a first wall intended to face the Earth, a second wall facing the first wall and third walls extending from the first wall to the second wall;
- an array of N electromagnetic emission and/or electromagnetic reception antennas,
- said satellite platform being characterized in that each antenna comprises said satellite casing and a respective metal strand extending in the plane of the first or second wall and;

each antenna comprises a respective electrical connector, connected electrically to the strand (i) and to the satellite casing and adapted to:

in emission, deliver a first electrical signal, received by the connector, to the strand and to the satellite casing for electromagnetic radiation, by the strand of the antenna and by the satellite casing, as a function of said first electrical signal; and/or in reception, to collect a second electrical signal from the transposition, by the strand of the antenna and by the satellite casing, of an electromagnetic radiation received by the antenna; wherein, if N=2, the orthogonal projections of the two strands on the first wall are orthogonal and if N>2, the orthogonal projection of the nth strand on the first wall is obtained by a rotation of +2π/N, n=2 to N, of the orthogonal projection of the (n-1) h strand on the first wall, said satellite platform comprising a beamformer adapted to obtain a control signal indicating any target directivity within an angular segment of coverage and/or a target polarization to be implemented by the antenna array, said beamformer comprising a controller adapted to calculate an attenuation and a phase-shift selectively for each antenna as a function of said control signal, said beamformer being adapted to:

in emission, apply to each of the first electrical signals intended for the N antennas, said attenuation and phase-shift calculated for the antenna for which said first signal is intended and deliver to the connector associated with the antenna said first duly adapted signal; and/or in reception, apply, to each of said second electrical signals collected by the connectors of the N antennas, said attenuation and phase-shift calculated for the antenna from which said first signal originates.

Faced with the impossibility of completely avoiding the diffraction by the satellite of the radiation of radiating elements, a radically different approach has been chosen, consisting in including the satellite in the electromagnetic operation of the antenna, in order to set up a communication with a mobile terminal on the Earth and emitting a signal in the same HF, VHF or UHF frequency band as the antenna.

Furthermore, as it is then no longer possible to produce radiating elements having the same radiation patterns, the second idea then consists in, on the contrary, disposing radiating elements which have complementary radiation patterns, making it possible to cover, by addition, all of the specified angular zone, ideally for each of the main polarization components.

In particular embodiments, said satellite platform will comprise one and/or the other of the following features:

the strands are fixed at the periphery of the first or second wall in the plane from which they extend, said strands also extending to the outside of said wall;

the N strands extend in the plane of the first wall;

N≥4;

the strands are produced in tape measure technology;

a ground plane on the second wall and parallel to said second wall.

According to a second embodiment, the present invention describes a method for implementing an electromagnetic beam from a satellite platform comprising:

a satellite delimited by a satellite casing composed of metal walls of the satellite, said walls comprising a first wall intended to face the Earth, a second wall facing the first wall and third walls extending from the first wall to the second wall;

an array of N electromagnetic emission and/or electromagnetic reception antennas, said method being characterized in that it comprises the following steps, each antenna comprising said satellite casing and a respective metal strand extending in the plane of the first or second wall and each antenna comprising a respective electrical connector, connected electrically to the strand and to the satellite casing, according to which, if N=2, the orthogonal projections of the two strands on the first wall are orthogonal and if N>2, the orthogonal projection of the nth strand on the first wall is obtained by a rotation of +2π/N, n=2 to N, of the orthogonal projection of the (n-1)th strand on the first wall:

in emission: supply of a first electrical signal, received by the connector, to the strand and to the satellite casing for electromagnetic radiation, by the strand of the antenna and by the satellite casing, as a function of said first electrical signal; and/or in reception: collection of a second electrical signal from the transposition, by the strand of the antenna and by the satellite casing, of an electromagnetic radiation received by the antenna;

obtaining, by a beamformer of said satellite platform, of a control signal indicating any target directivity within an angular segment of coverage and/or a target polarization to be implemented by the antenna array;

calculation, by a controller of said beamformer, of an attenuation and of a phase-shift selectively for each antenna as a function of said control signal;

in emission, application, by said beamformer to each of the first electrical signals intended for the N antennas, of said attenuation and phase-shift calculated for the antenna for which said first signal is intended and delivery to the connector associated with the antenna of said first signal duly adapted; and/or in reception, application, by said beamformer to each of said second electrical signals collected by the connectors of the N antennas, of said attenuation and phase-shift calculated for the antenna from which said first signal originates.

In particular embodiments, said satellite platform will comprise one and/or the other of the following features:

the strands are fixed at the periphery of the first or second wall in the plane from which they extend, said strands also extending to the outside of said wall;

the N strands extend in the plane of the first wall;

N≥4.

BRIEF DESCRIPTION OF THE DRAWINGS

The invention will be better understood, and other features, details and advantages will become more apparent on reading the following description, given in a nonlimiting manner, and using the attached figures, given by way of example.

Identical references can be used in different figures when they denote identical or comparable elements.

DETAILED DESCRIPTION

A particular embodiment of the invention is now described with reference to the figures.

Figure 2:
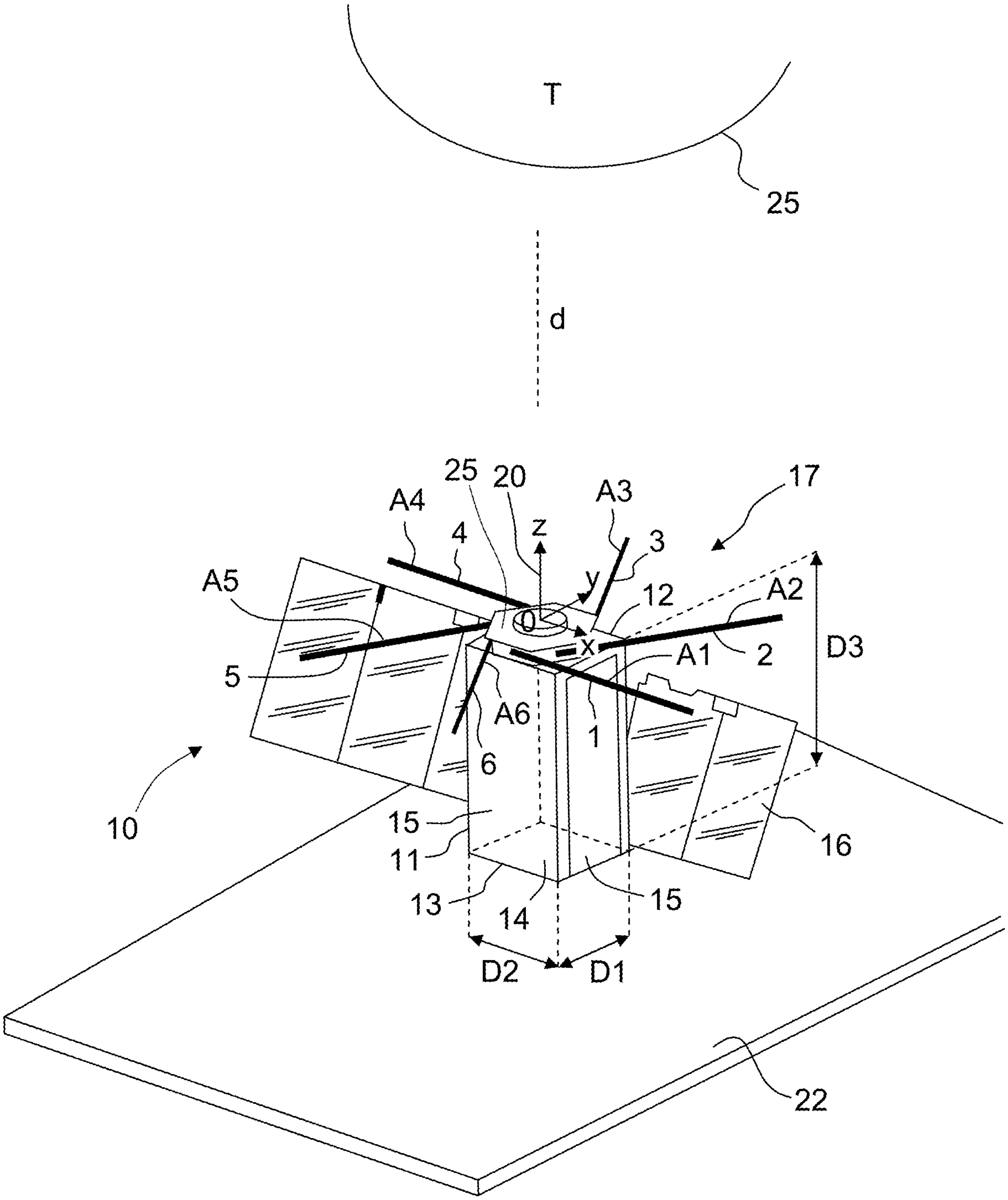
FIG. 2 is a representation of a satellite platform in an embodiment of the invention.

FIG. 2 schematically represents a satellite platform 10 in an embodiment of the invention, in orbital trajectory at a distance d from the Earth T 20, d lying between 500 and 1000 km. The satellite platform 10 comprises a satellite 13 delimited by its metal satellite casing 11, here substantially describing a parallelepiped (generally, of dimensions at least 12 or 16 U with Earth face: for example 20*20 $cm^2$ (D1×D2) and height 30 or 40 cm (D3) or else larger Earth face, for example 30*30, or else larger height, for example lying between 50-60 cm). The satellite platform 10 further comprises solar panels 16 that are deployed around the satellite casing 11. The metal casing 11 comprises a wall 12, disposed facing the Earth 25, a wall 14 facing the wall 12, in the direction opposite to the Earth 25 and four lateral walls 15 extending from one to the other of the walls 12, 14 and thus closing the casing 11. Hereinafter, the wall 12 will be called the Earth face and the wall 14 will be called the anti-Earth face.

An orthonormal reference frame (O, x, y, z) is considered attached to the Earth face wall 12, in which O, x and y are, respectively, a point and two axes in the plane of the wall 12.

The satellite platform 10 comprises an antenna system 17 comprising N antennas A1, A2, . . . , AN, with N greater than or equal to 2. The antenna system 17 operates in HF, VHF or UHF frequency bands, the wavelength of which is situated between 0.5 and 5 meters. The dimensions of the satellite 13 are of the order of several tenths of a wavelength; the width D1, the length D2, the height D3 are each less than the wavelength, for example lying between a quarter wavelength and one wavelength.

For example, in the particular case considered, the antenna system 17 is in VHF band, operating at 150 MHz, corresponding to a wavelength of 2 meters, and is fixed on the casing 11 of the satellite 13, of dimensions D1×D2×D3 equal to 20 cm×20 cm×40 cm (the satellite 13 in other embodiments is a minisatellite, the dimensions of which are comparable to the wavelength). The length of each metal strand is a quarter wavelength. Such a length makes it possible to establish a quarter-wave mode on the metal strand, which facilitates the adaptation of the antenna (it will be noted that it is possible also to have a length corresponding to a half-wave; a higher mode would be established on the antenna, which would also allow its adaptation, with a radiation of each radiating element that is different).

As described above, the invention modifies the operation of a conventional dipole antenna by replacing, in each antenna Ai, i=1 to N, the second strand of the dipole with the satellite 13. Thus, each antenna Ai comprises one metal strand, (the strand number i) and the metal casing 11 of the satellite 13. Each antenna Ai is powered by an electrical connector adapted to inject an electrical signal useful to the strand i at one end thereof and to inject it also into the satellite casing 11. Electrical currents are established on the walls of the satellite. An overall resonance can then be established over the metal strand—satellite assembly.

In one embodiment, each strand extends in the plane of the Earth face wall 12 or in that of the anti-Earth face wall 14.

In one embodiment, the direction of the strands (defined by the vector starting from the end of the strand linked to the electrical connector toward the other end) is distributed spatially, so as to obtain directions of maximum radiation that are complementary (also called preferential complementary radiation directions).

In one embodiment, if N>2: if all the strands are in the plane of the same Earth face wall 12 or anti-Earth face wall 14, the strand of the antenna An is angularly spaced apart from the strand of the antenna An-1 by +2π/N, for n=1 to N; if the strands are distributed between these two planes, this rule is then observed for the orthogonal projections of the strands on the plane of the earth face wall 12.

In one embodiment, the power supply connectors of the strands are situated at the periphery of the earth face wall 12 (or anti-earth face wall 14), the strands then extending mostly outside of the wall. That makes it possible to establish as a priority vertical currents (on the axis Oz) on the lateral walls 15 of the satellite.

Thus, in the embodiment considered with reference to FIG. 2, N=6 and the 6 strands, referenced 1, 2, 3, 4, 5, 6 anchored at the periphery of the wall 12 extend mostly to the outside of the wall 12, in the plane of the earth face wall 12, here corresponding to the small side of the satellite. Any two adjacent strands are spaced apart by +2π/N (here π/3).

In one embodiment, if N=2, the strands, all positioned in the plane of the earth face wall 12 or all positioned in the plane of the anti-earth face wall 14 (or the orthogonal projections of the strands, if they are distributed between these two planes) are spaced apart angularly by 90°.

In one embodiment, N is the total number of antennas on the platform, each comprising said satellite casing and a respective metal strand extending in the plane of the first or second wall.

In one embodiment, these metal strands are produced with tape measure technology. Tape measures are flexible tapes that have a circular arc section, the radius of curvature of which is convex on a first face of the tape and concave on a second face of the tape. The strand can thus be in wound configuration, occupying a restricted volume, prior to the activation of the antenna and be deployed and rigid, once activated, the tapes being able to switch from the wound state to the deployed state essentially by virtue of their specific elastic energy. The tape measures are therefore well suited to the manufacturing of deployable wire antennas and to minimising the weight of the antenna.

Figure 4:
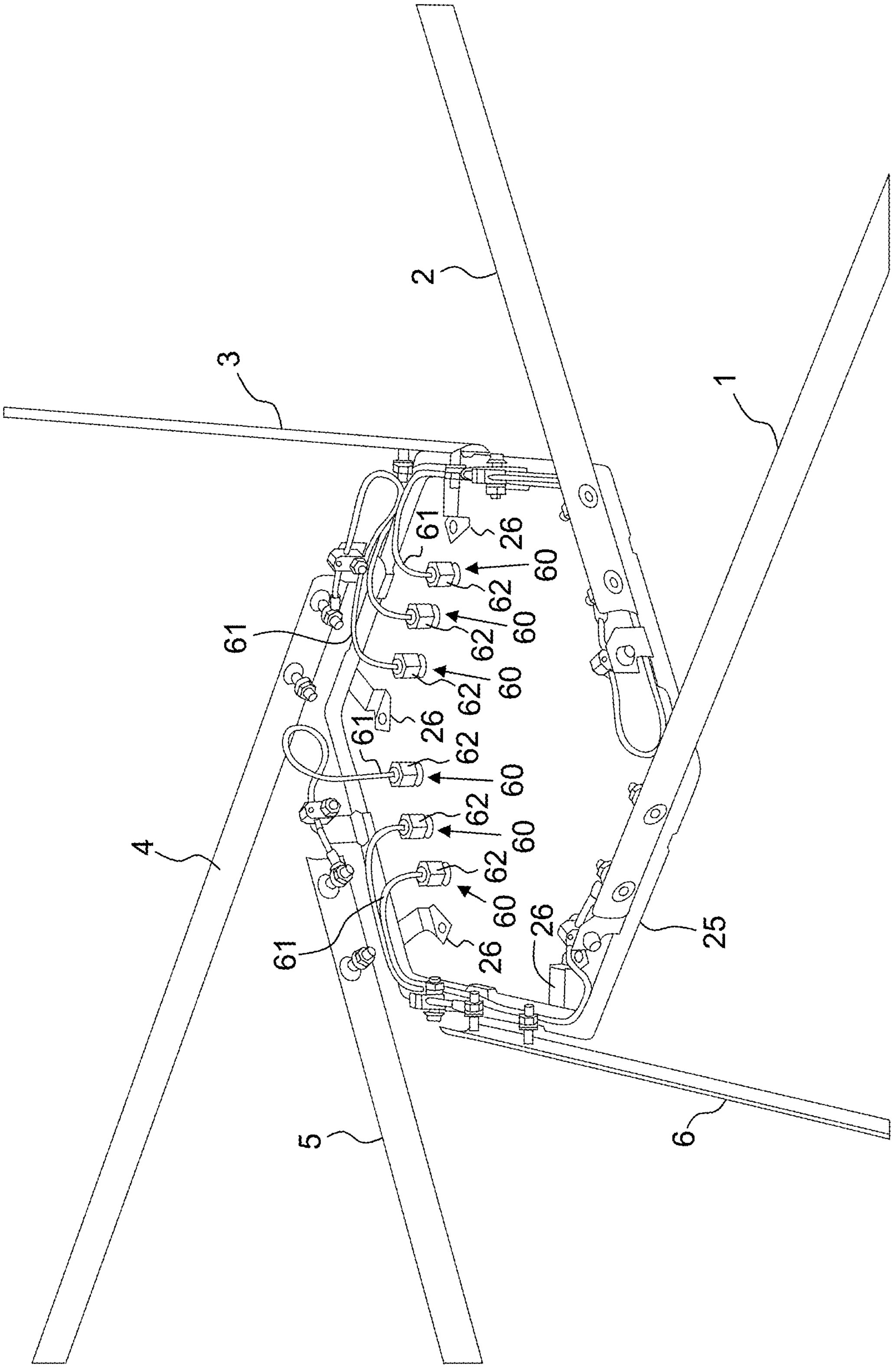
FIG. 4 illustrates the connection between the strands and the satellite in an embodiment of the invention.

FIG. 4 represents a detail of the power supply of the antennas An, n=1 to 6. The injection of the electrical signal into each antenna Ai between the strand and the satellite casing is performed by means of a connector 60, here a coaxial cable, disposed between the electronic module adapted to supply this signal in emission (and/or to process this signal in reception; in one embodiment, it is the beamforming device 50 mentioned later). With each antenna An, n=1 to N, there is thus associated a connector 60, transporting the electrical signal specific to this antenna An. The central core 61 of a connector 60 is connected to the end of the satellite strand n anchored to the satellite. The peripheral crown ring 62 of the connector 60 is, for its part, placed in direct contact with the Earth face wall 12 of the satellite. The ground of the coaxial cable 60 is transferred to the metal mandrel 25 directly in contact with the wall 12 of the satellite (the mandrel 25 is attached to the wall 12 by tongues 26) (in another embodiment, the ground of the coaxial cable could be transferred directly to the Earth face, at the point of excitation of the metal strands).

In the case considered, the end of the strands which is anchored to the wall 12 is so at a mandrel 25 around which they were wound before the operational activation of the antenna system 17 for example (the deployment of the tape measures on their respective axis is ensured for example autonomously by their spontaneous unwinding following a step of releasing of the tapes by the disappearance of fusible wires when a current of high intensity is triggered).

If a strand i of antenna Ai were anchored onto one of the faces 12, 14, but at right angles to these faces, the currents which would be established on this face would be compensated and would contribute little to the radiation. The currents on the lateral walls 15 would, on the other hand, contribute to the radiation: the resultant radiation pattern for the antenna Ai would be very similar to that of a half-wave dipole as represented in FIG. 1, with a radiation in $E_\varphi$ that is very low (−45 dB in a simulated example).

Figure 1:
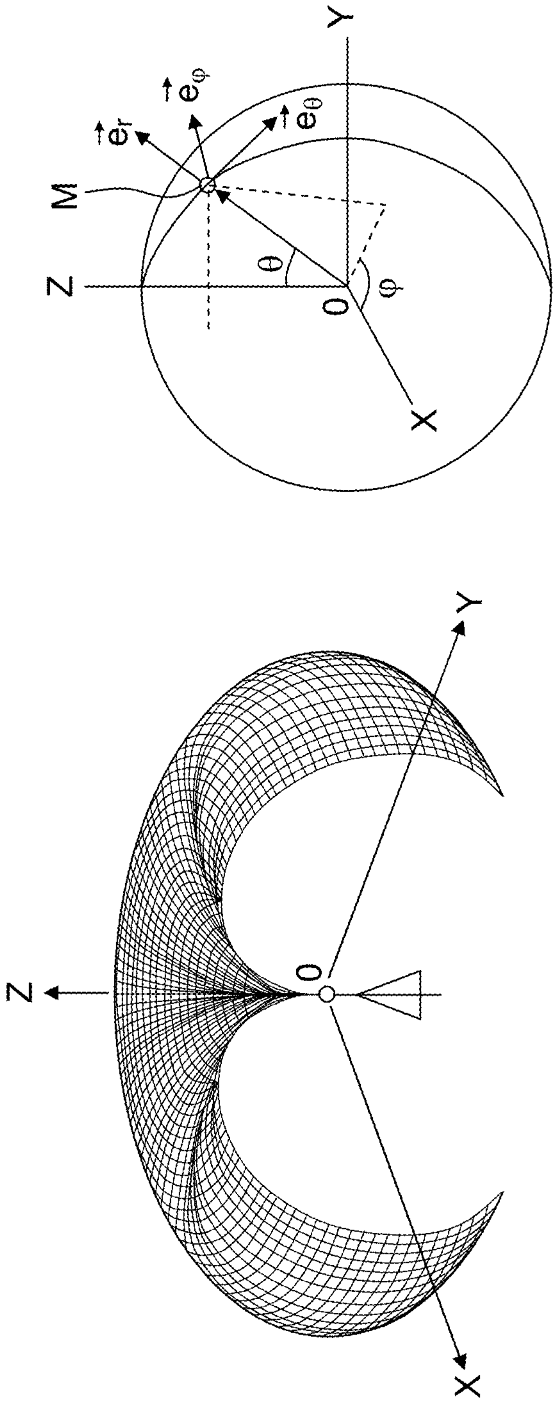
FIG. 1 is an illustration of the radiation of a dipole antenna, as known from the prior art.

On the contrary, disposing the strands in the plane of the walls 12 or 14 and anchored at the periphery of these walls as proposed according to the invention allows the component $E_\varphi$ to reach values similar to those of the component $E_\theta$, the direction for which the component $E_\theta$ is maximal corresponding to the direction for which the component $E_\varphi$ is minimal, and vice versa: for a strand in the plane of the Earth face wall 12, in the plane xnOz, xn defining the axis of the nth metal strand (n=1 to N), the radiation according to the component $E_\theta$ is maximal in the plane xnOz, and the radiation according to the component $E_\varphi$ is maximal in this plane; conversely, in the plane ynOz, the radiation according to the component $E_\varphi$ is maximal and the radiation is minimal for the component $E_\theta$ (by reusing the designations employed $E_\theta$ and $E_\varphi$ with reference to FIG. 1 and by considering an orthonormal reference frame (yn, z, xn) instead of (X, Y, Z)).

Also, if considering the upper half-space (i.e. the space comprised between the satellite and the earth), and more specifically the typical angular segment applicable to the minisatellites or nanosatellites in low Earth orbit: $\theta<55°$, $\varphi \in [0, 2\pi]$ (the angles θ, φ are expressed in a spherical reference frame associated with the orthonormal reference frame Oxyz of FIG. 2, $\vec{e}_r$ being oriented along the direction of propagation and defining these angles), each radiating element (defined by a horizontal strand i and the nanosatellite) contributes on prioritized angular zones. The angular zones corresponding to two radiating elements with adjacent strands change by a rotation of 2π/N, if there are N radiating elements.

Figure 5:
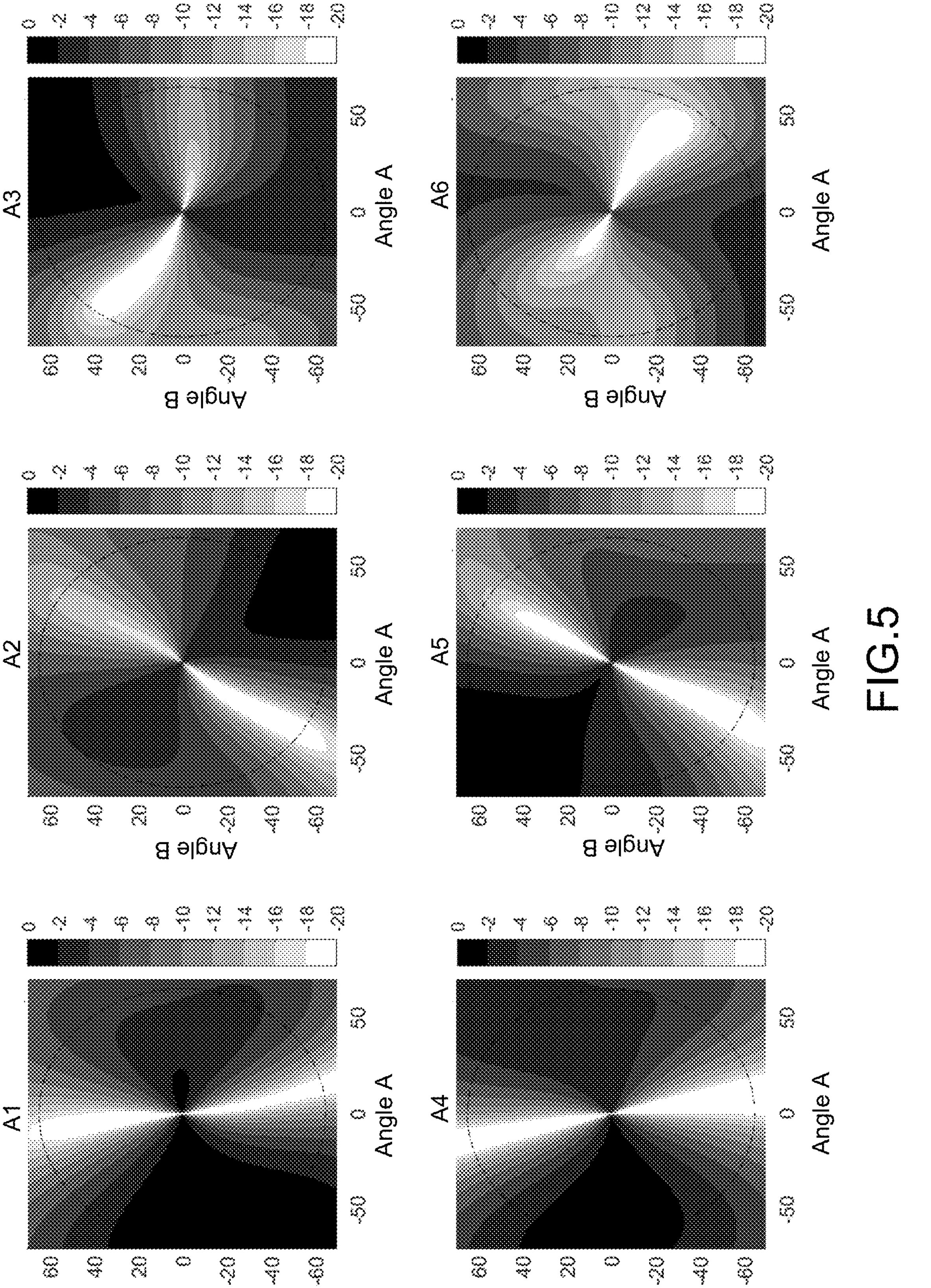
FIG. 5 is a representation of the unitary radiation patterns in polarization $E_\varphi$ for each of the 6 antennas in an embodiment of the invention.
Figure 6:
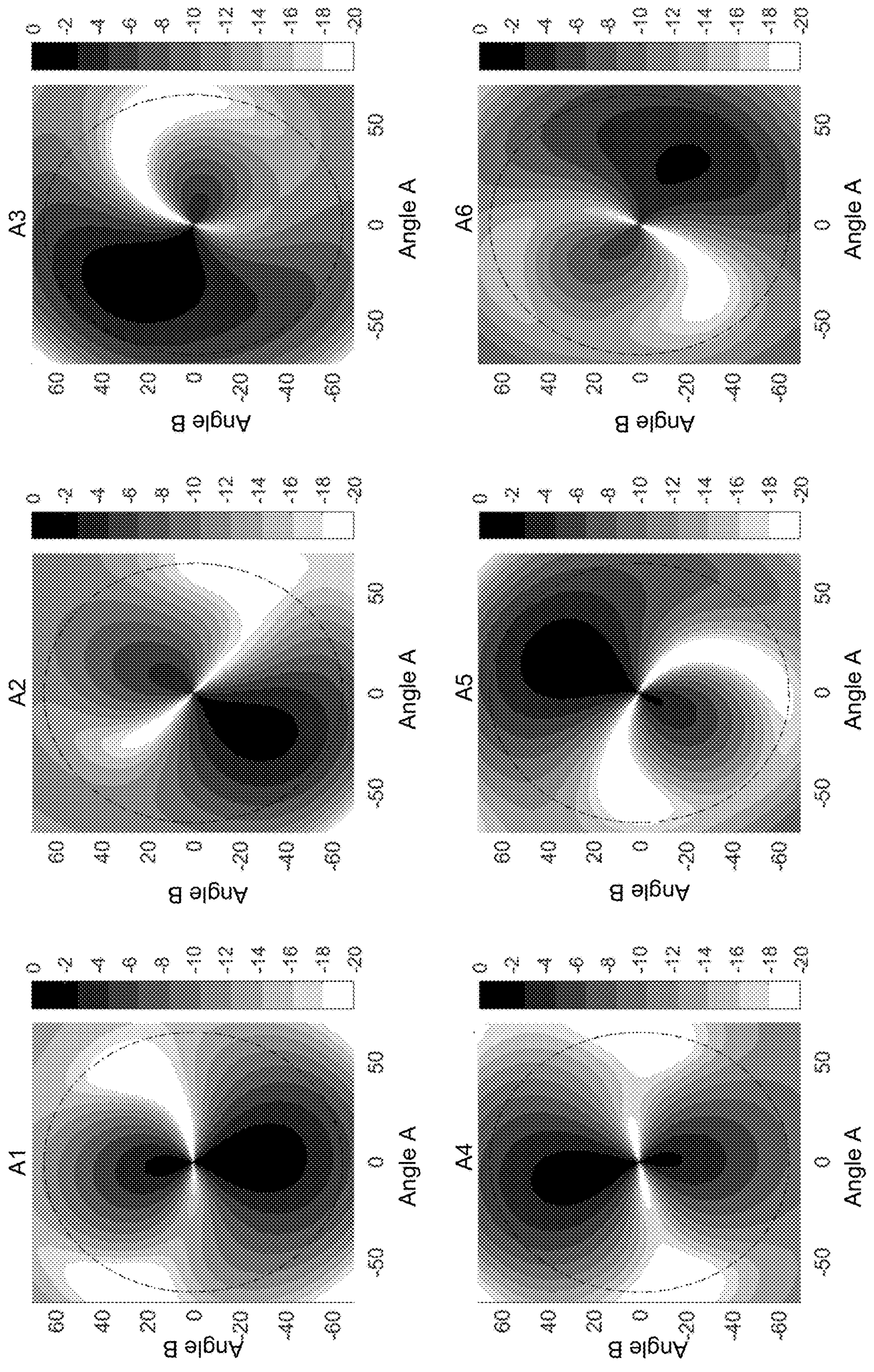
FIG. 6 is a representation of the unitary radiation patterns in polarization $E_\theta$ for each of 6 antennas in an embodiment of the invention.

FIG. 5 (respectively FIG. 6) highlights these angular segments, by representing, as a function of the angles A, B, the radiation according to the component $E_\varphi$ (respectively $E_\theta$) in the configuration considered in FIG. 2 for each antenna A1, . . . , A6, represented in grey levels from −20 dBi, in steps of two. The angles A, respectively B, each in the window [−60, +60] are seen from the satellite, with $A=\theta \sin(\varphi)$, $B=\theta\cos(\varphi)$.

The preferential angular segments corresponding to the two components $E_\varphi$, $E_\theta$ are orthogonal. The radiating elements having metal strands oriented in opposite directions (like the strands 1 and 4, or even the links 2 and 5, or the links 3 and 6) contribute over the same angular segments. This effect is particularly marked for the radiation in polarization $E_\varphi$ which is mainly produced by the metal strand and the currents on the Earth face wall 12 of the satellite. The radiation patterns in polarization $E_\theta$, for which the lateral walls 15 of the satellite contribute, are less symmetrical, probably because of the stronger currents on the lateral faces 15 situated on the side of the metal strand.

Figure 3:
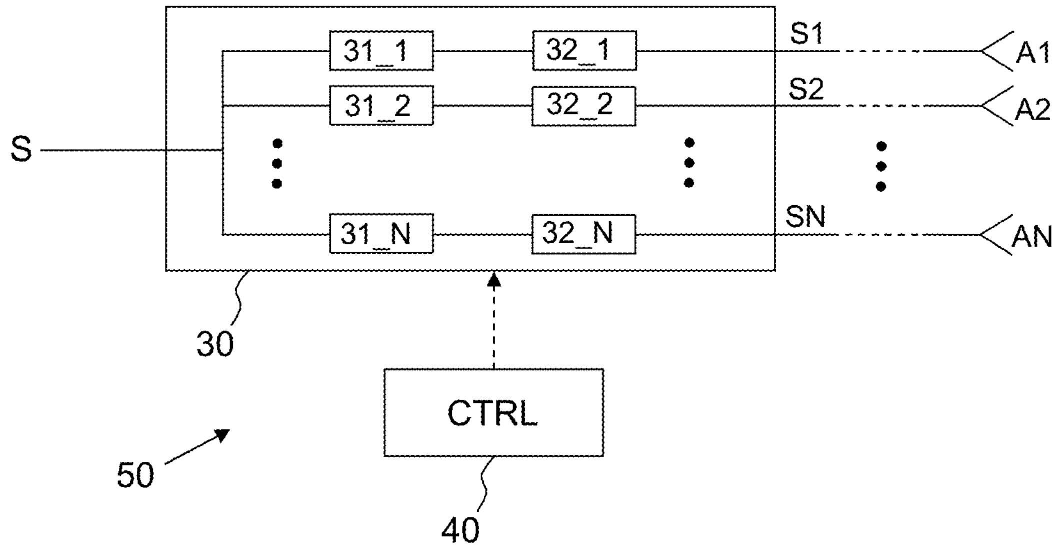
FIG. 3 is a schematic representation of the beamforming in an embodiment of the invention.

In one embodiment, the satellite platform 10 comprises an electronic beamforming device 50 represented schematically in FIG. 3, that makes it possible to synthesize more directive beams (in a selected direction, any within the angular field covered by the sum of the radiation patterns), in a selected polarization, and increase the gain (by comparison to the simple juxtaposition of the unitary beams of N antennas), by combining, after application of an amplitude and phase weighting, the electrical signals associated with each radiating element.

The beamforming device 50 comprises an electronic controller 40 and an electronic beamforming block 30, comprising N processing chains, the processing chain No. i, i=1 to N, comprising an attenuator 31_i and a phase-shifter 32_i. The attenuator 31_i is adapted to apply an attenuation gain to the signal from the processing chain i which is supplied to it as input and the phase-shifter 32_i is adapted to apply a phase-shift to the signal from the processing chain i which is supplied to it as input. The values of the gains and of the phase-shifts for each chain No. i are controlled by the controller 40 as a function of the specified prioritized direction and of the polarization specified for the radiation of the antenna system 17.

In emission, an electrical signal S carrying the useful information to be transmitted by the antenna system 17 is divided into N signals, one of these signals being supplied as input to each processing chain. An attenuation, then a phase-shift, the values of which are determined by the controller 40 selectively for each processing chain i, as a function of the specified direction and of the specified polarization of radiation of the antenna system 17, are applied and the resulting signal Si is delivered to the electrical connector supplying power to the antenna Ai.

In reception, similarly, the electrical signals delivered by the connectors of antennas A1, . . . , AN are each phase-shifted, then attenuated, with, on each chain i, an attenuation and a phase-shift of values determined by the controller selectively for each chain i, as a function of the specified direction and of the specified polarization for the radiation picked up by the antenna system 17.

It will be noted that the beamforming can be done in analog mode or, after frequency transposition, in digital mode.

In one embodiment, the values of the attenuation and phase-shift coefficients for each chain i, as a function of the specified direction and of the specified polarization for the radiation of the antenna system 17, are determined, in a prior calibration phase, by a “conjugate matching” method, which maximizes the gain in a given direction, or an MMSE (“maximum mean squared error”) processing method which maximizes the gain in a given direction, while minimizing the interferences in the other directions.

Figure 7:
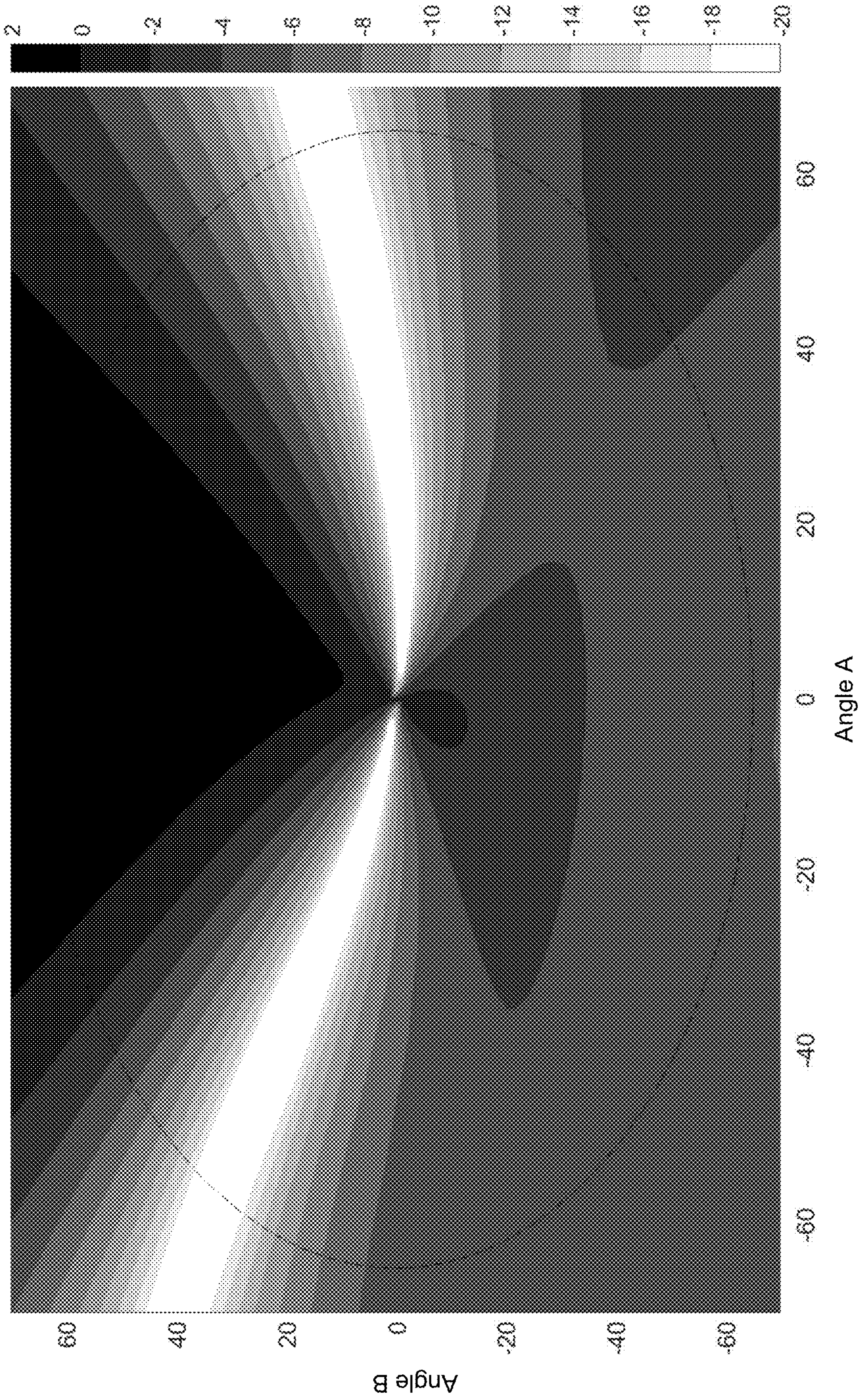
FIG. 7 is a representation of a radiation pattern in polarization $E_\varphi$ obtained by beamforming in an embodiment of the invention.
Figure 8:
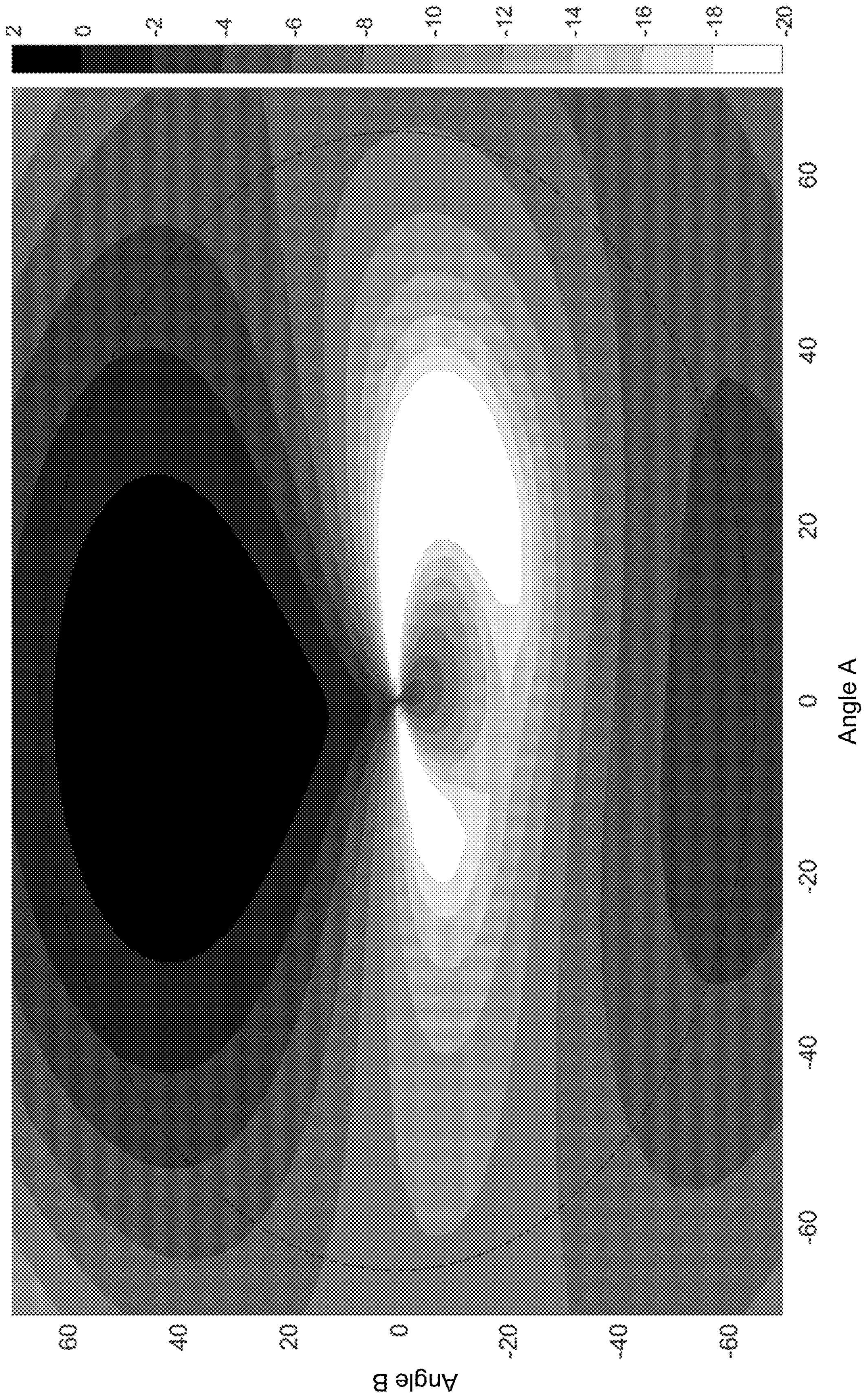
FIG. 8 is a representation of a radiation pattern in polarization $E_\theta$ obtained by beamforming in an embodiment of the invention.

In the configuration represented in FIG. 2, in which N=6, it has thus been possible to create, in succession by way of examples, 24 beams each corresponding to a distinct preferential direction of radiation, regularly distributed over the coverage, pointing for a constant elevation θ=55° from the satellite and contributing according to the polarization $E_\varphi$ (one of these 24 beams is represented in FIG. 7, with the same grey levels as those considered previously), as well as 24 other beams each corresponding to a distinct preferential direction of radiation, regularly distributed over the coverage, pointing for a constant elevation θ=55° and contributing according to the polarization $E_\theta$ (one of these 24 beams is represented in FIG. 8).

The "Conjugate Matching" method calculates the weighting applied to the different radiating elements to maximize the gain in a direction θ, φ, and for a given polarization. It calculates the attenuation and phase-shift coefficients such that they are the conjugate coefficients of the law of illumination of the different radiating elements, illuminated by a flat wave with the polarization considered, and incident in a direction θ, φ.

The patterns of the individual radiating elements give their responses in incidence. Consequently, the amplitude coefficients vary in the range of values between 0 and −20 dB, and the phase law varies within the range of values between 0 and 360°.

The controller 40, in embodiments, is adapted to, in reaction to a received command, control the switchover between two distinct beamforming configurations (for example following a change of geographic location of a mobile terminal with which a radiocommunication must be set up via the antenna system 17), giving rise to the replacement of the beamforming coefficients with new values in order to focus the antenna in another direction and/or with another polarization, while increasing the gain thereof with respect to the simple summing of the individual antenna patterns Ai, i=1 to N. The controller 40, in embodiments, is adapted to, in reaction to a received command, control the switchover between a beamforming configuration and a basic configuration simply summing the individual patterns (without beamforming), even a minimal configuration by for example supplying power to only a few antennas.

The size of the satellite 13 determines the distributions of surface current which are established thereon. Lateral walls 15 that are more slender (D3 greater) for example will be able to be the support of a higher-order mode for the vertical currents that are established along these lateral walls. A satellite with larger walls 12, 14 will make it possible to increase the radiation according to the component $E_\varphi$. The mode of operation does however remain the same, with respect to the complementarity of the angular segments associated with the components $E_\theta$ and $E_\varphi$. The commercially available electromagnetic simulation tools now make it possible to predict this overall operation accurately, by modelling the antenna system and its satellite environment.

In one embodiment, in order to minimize the radiation in the lower half-space, the satellite platform 10 further comprises a ground plane 22 orthogonal to the lateral walls 15 of the satellite (ground plane 22 in the plane of the anti-Earth wall 14 or parallel to this wall and situated just under this wall 14 for example). This large ground plane 22 can be a very openwork grating, in which the size of the openings is of the order of λ/10; each of the sides of this plane is at least 5λ. It could be deployed at the same time as the solar generators 16.

The deployment of such a ground plane 22 makes it possible to significantly increase the gain in the upper half-space. It does not affect the operation of the antenna system 17 which is still reconfigurable in terms of pointing and polarization.

The present invention thus proposes, in a manner compatible with the constraints inherent to small satellite platforms, an antenna that is deployable, reconfigurable in pointing direction and in polarization, that makes it possible to produce a beam whose gain is greater than that of an omnidirectional antenna, typically 2-5 dBi, in any direction lying within a wide angular segment (typically ±60°). The solution therefore addresses particularly well the constraints encountered in communications with terminals on the ground and that may be moving around in geographic segments that are very varied and with the polarization of the emitted signal difficult to control, also affected by the propagation conditions in the atmosphere.

The invention claimed is:

1. A satellite platform comprising:

a satellite delimited by a satellite casing composed of metal walls of the satellite, said walls comprising a first wall intended to face the Earth, a second wall facing the first wall and third walls extending from the first wall to the second wall;

an array of N electromagnetic emission and/or electromagnetic reception antennas (Ai, i=1 to 6), said satellite platform being characterized in that each antenna comprises said satellite casing and a respective metal strand (i=1 to 6) extending in the plane of the first or second wall and;

each antenna (Ai, i=1 to 6) comprises a respective electrical connector, connected electrically to the strand (i) and to the satellite casing and adapted to:

in emission, deliver a first electrical signal, received by the connector, to the strand (i=1 to 6) and to the satellite casing for electromagnetic radiation, by the strand of the antenna and by the satellite casing, as a function of said first electrical signal; and/or in reception, collect a second electrical signal from the transposition, by the strand of the antenna (i=1 to 6) and by the satellite casing, of an electromagnetic radiation received by the antenna;

wherein, if N=2, the orthogonal projections of the two strands on the first wall are orthogonal and if N>2, the orthogonal projection of the nth strand on the first wall is obtained by a rotation of +2π/N, n=2 to N, of the orthogonal projection of the (n-1)th strand on the first wall, said satellite platform comprising a beamformer adapted to obtain a control signal indicating any target directivity within an angular segment of coverage and/or a target polarization to be implemented by the antenna array, said beamformer comprising a controller adapted to calculate an attenuation and a phase-shift selectively for each antenna as a function of said control signal, said beamformer being adapted to:

in emission, apply, to each of the first electrical signals intended for the N antennas, said attenuation and phase-shift calculated for the antenna for which said first signal is intended and deliver to the connector associated with the antenna said duly adapted first signal; and/or in reception, apply, to each of said second electrical signals collected by the connectors of the N antennas, said attenuation and phase-shift calculated for the antenna from which said first signal originates.

2. The satellite platform as claimed in claim 1, wherein the strands (i=1 to 6) are fixed at the periphery of the first or second wall in the plane of which they extend, said strands (i=1 to 6) extending also to the outside of said wall.

3. The satellite platform as claimed in claim 1, wherein the N strands extend in the plane of the first wall.

4. The satellite platform as claimed in claim 1, wherein N≥4.

5. The satellite platform as claimed in claim 1, wherein the strands (i=1 to 6) are produced in tape measure technology.

6. The satellite platform as claimed in claim 1, comprising a ground plane on the second wall and parallel to said second wall.

7. A method for implementing an electromagnetic beam of a satellite platform comprising:

a satellite delimited by a satellite casing composed of metal walls of the satellite, said walls comprising a first wall intended to face the Earth, a second wall facing the first wall and third walls extending from the first wall to the second wall;

an array of N electromagnetic emission and/or electromagnetic reception antennas (Ai, i=1 to 6), said method comprising the following steps, each antenna comprising said satellite casing and a respective metal strand (i=1 to 6) extending in the plane of the first or second wall and each antenna (Ai, i=1 to 6) comprising a respective electrical connector, connected electrically to the strand (i) and to the satellite casing, wherein, if N=2, the orthogonal projections of the two strands on the first wall are orthogonal and if N>2, the orthogonal projection of the nth strand on the first wall is obtained by a rotation of $+2\pi/N$, n=2 to N, of the orthogonal projection of the (n−1)th strand on the first wall:

in emission: supply of a first electrical signal, received by the connector, to the strand (i=1 to 6) and to the satellite casing for electromagnetic radiation, by the strand of the antenna and by the satellite casing, as a function of said first electrical signal; and/or in reception: collection of a second electrical signal from the transposition, by the strand of the antenna (i=1 to 6) and by the satellite casing, of an electromagnetic radiation received by the antenna;

obtaining, by a beamformer of said satellite platform, of a control signal indicating any target directivity within an angular segment of coverage and/or a target polarization to be implemented by the antenna array;

calculation, by a controller of said beamformer, of an attenuation and of a phase-shift selectively for each antenna as a function of said control signal, in emission, application, by said beamformer to each of the first electrical signals intended for the N antennas, of said attenuation and phase-shift calculated for the antenna for which said first signal is intended and delivery to the connector associated with the antenna of said duly adapted first signal; and/or in reception, application, by said beamformer to each of said second electrical signals collected by the connectors of the N antennas, of said attenuation and phase-shift calculated for the antenna from which said first signal originates.

8. The method for implementing an electromagnetic beam of a satellite platform as claimed in claim 7, wherein the strands (i=1 to 6) are fixed at the periphery of the first or second wall in the plane of which they extend, said strands (i=1 to 6) also extending to the outside of said wall.

9. The method for implementing an electromagnetic beam of a satellite platform as claimed in claim 7, wherein the N strands extend in the plane of the first wall.

10. The method for implementing an electromagnetic beam of a satellite platform as claimed in claim 7, wherein N≥4.

* * * * *